United States Patent [19]
Saltzman

[11] Patent Number: 5,970,847
[45] Date of Patent: Oct. 26, 1999

[54] BABY FORMULA PREPARATION SYSTEM

[76] Inventor: David L. Saltzman, 161-06 Jewel Ave., #4K, Flushing, N.Y. 11365

[21] Appl. No.: 09/098,374

[22] Filed: Jun. 16, 1998

[51] Int. Cl.$^6$ .............................. A47J 27/00; A47J 43/27
[52] U.S. Cl. ............................ 99/287; 99/348; 99/323.3; 99/483; 366/146; 366/314
[58] Field of Search ................................. 99/287, 323.3, 99/348, 510, 536, 483; 241/38, 39, 46.17, 60, 62; 366/205, 314, 146

[56] References Cited

U.S. PATENT DOCUMENTS

| | | | |
|---|---|---|---|
| 3,344,733 | 10/1967 | Herrera | 99/287 X |
| 3,814,332 | 6/1974 | Nakao | 241/38 |
| 4,510,853 | 4/1985 | Takagi | 99/286 |
| 4,889,041 | 12/1989 | Mahlich et al. | 99/298 X |
| 4,903,585 | 2/1990 | Wimmers et al. | 99/287 X |
| 5,511,882 | 4/1996 | Anwunah et al. | 366/314 |
| 5,797,313 | 8/1998 | Rothley | 366/205 X |

*Primary Examiner*—Reginald L. Alexander

[57] ABSTRACT

A baby formula preparation system is provided including a blender with a blade assembly for agitating fluid within the blender upon the actuation of an associated blending mechanism. Also included is a pump assembly situated adjacent to the blender for pumping fluid within the blender when actuated.

10 Claims, 2 Drawing Sheets

BABY FORMULA PREPARATION SYSTEM

BACKGROUND OF THE INVENTION

1. Field of the Invention

The present invention relates to coffee makers and more particularly pertains to a new baby formula preparation system for preparing baby formula in a convenient manner.

2. Description of the Prior Art

The use of coffee makers is known in the prior art. More specifically, coffee makers heretofore devised and utilized are known to consist basically of familiar, expected and obvious structural configurations, notwithstanding the myriad of designs encompassed by the crowded prior art which have been developed for the fulfillment of countless objectives and requirements.

Known prior art coffee makers and the like include U.S. Pat. No. 5,392,694; U.S. Pat. No. 5,335,589; U.S. Pat. No. 1,774,980; U.S. Pat. No. 3,039,488; U.S. Pat. No. 5,397,031; and Foreign Patent WO 93/22042.

In these respects, the baby formula preparation system according to the present invention substantially departs from the conventional concepts and designs of the prior art, and in so doing provides an apparatus primarily developed for the purpose of preparing baby formula in a convenient manner.

SUMMARY OF THE INVENTION

In view of the foregoing disadvantages inherent in the known types of coffee makers now present in the prior art, the present invention provides a new baby formula preparation system construction wherein the same can be utilized for preparing baby formula in a convenient manner.

The general purpose of the present invention, which will be described subsequently in greater detail, is to provide a new baby formula preparation system apparatus and method which has many of the advantages of the coffee makers mentioned heretofore and many novel features that result in a new baby formula preparation system which is not anticipated, rendered obvious, suggested, or even implied by any of the prior art coffee makers, either alone or in any combination thereof.

To attain this, the present invention generally comprises a blender having a container having an inverted frusto-conical configuration with an open top and an open bottom. As shown in FIG. 3, a closed loop handle is mounted on the container. The blender further includes a blade assembly having a base. With reference now to FIG. 4, the base assembly includes an annular portion defining a cylinder and a planar portion coupled within a central extent of the annular portion. As such, the annular portion defines a lip with a lower extent extending downwardly from the planar portion. The annular portion further defines an upper extent extending upwardly from the planar portion with a plurality of threaded grooves formed therein. Such threaded grooves are adapted for engaging threaded grooves formed in the open bottom of the container. The blade assembly of the blender further includes a plastic blade rotatably mounted above the planar portion of the base. An engagement portion is rotatably mounted below the planar portion of the base and fixed to the blade for rotating coincidentally therewith. As shown in the Figures, the blender further includes a lid removably coupled to the open top of the container. For reasons that will soon become apparent, the lid has a central aperture formed therein. As shown in FIG. 3, a housing is provided including a central portion having a rectangular configuration with a square bottom face and a peripheral side wall. Such peripheral side wall is formed of a front face, a rear face, and a pair of side faces defining an interior space and an open top. For allowing access to the interior space of the housing, the open top has a lid hingably coupled to the rear face of the peripheral side wall. The housing further includes an upper extension integrally coupled to the front face of the peripheral side wall adjacent to the open top and extending outwardly therefrom. Associated therewith is a lower extension integrally coupled to the front face of the peripheral side wall adjacent to the bottom face. The lower extension of the housing extends from the central portion of the housing in parallel relationship with the upper extension. The lower extension has an annular lip coupled to a top surface thereof which extends upwardly therefrom. Mounted between each face of the peripheral side wall of the housing is a heating plate. As shown in FIG. 3, the heating plate resides adjacent to the bottom face of the housing for defining a water compartment which may be filled with water via the open top of the housing. The heating plate is connected to a power source with a heating control switch connected therebetween which is mounted to a front surface of the upper extension. In use, the heating control switch is adapted for controlling the heating of the water within the housing. FIG. 4 best shows a blending mechanism including an engagement portion rotatably mounted on the lower extension of the housing. The engagement portion of the blending mechanism is preferably situated within the annular lip for engaging that of the blender when the same is mounted thereon. Mounted within the lower extension of the housing is a motor that is connected to the engagement portion of the blending mechanism for rotating the same upon the actuation thereof. With reference again to FIG. 3, it is shown that a pump assembly includes a tube. Such tube has a first open end positioned adjacent to the heating plate within the water compartment of the housing. A second end of the tube extends through the upper extension and downwardly from a bottom surface thereof. It is imperative that the second end of the tube reside above the aperture of the lid of the blender during use. The pump assembly further includes a pump mounted on the tube. In operation, the pump of the pump assembly serves for pumping water from within the water compartment into the container of the blender upon the actuation thereof. For filtering water flowing within the tube when the pump is actuated, a filter is preferably mounted on the tube. Finally, a control assembly is connected between the motor of the blending mechanism and the pump of the pump assembly. The control means serves to actuate the pump and the motor coincidentally upon the depression of an actuation button mounted on the lower extension of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new baby formula preparation system apparatus and method which has many of the advantages of the coffee makers mentioned heretofore and many novel features that result in a new baby formula preparation system which is not anticipated, rendered obvious, suggested, or even implied by any of the prior art coffee makers, either alone or in any combination thereof.

It is another object of the present invention to provide a new baby formula preparation system which may be easily and efficiently manufactured and marketed.

It is a further object of the present invention to provide a new baby formula preparation system which is of a durable and reliable construction.

An even further object of the present invention is to provide a new baby formula preparation system which is susceptible of a low cost of manufacture with regard to both materials and labor, and which accordingly is then susceptible of low prices of sale to the consuming public, thereby making such baby formula preparation system economically available to the buying public.

Still yet another object of the present invention is to provide a new baby formula preparation system which provides in the apparatuses and methods of the prior art some of the advantages thereof, while simultaneously overcoming some of the disadvantages normally associated therewith.

Still another object of the present invention is to provide a new baby formula preparation system for preparing baby formula in a convenient manner.

Even still another object of the present invention is to provide a new baby formula preparation system that includes a blender with a blade assembly for agitating fluid within the blender upon the actuation of an associated blending mechanism. Also included is a pump assembly situated adjacent to the blender for pumping fluid within the blender when actuated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
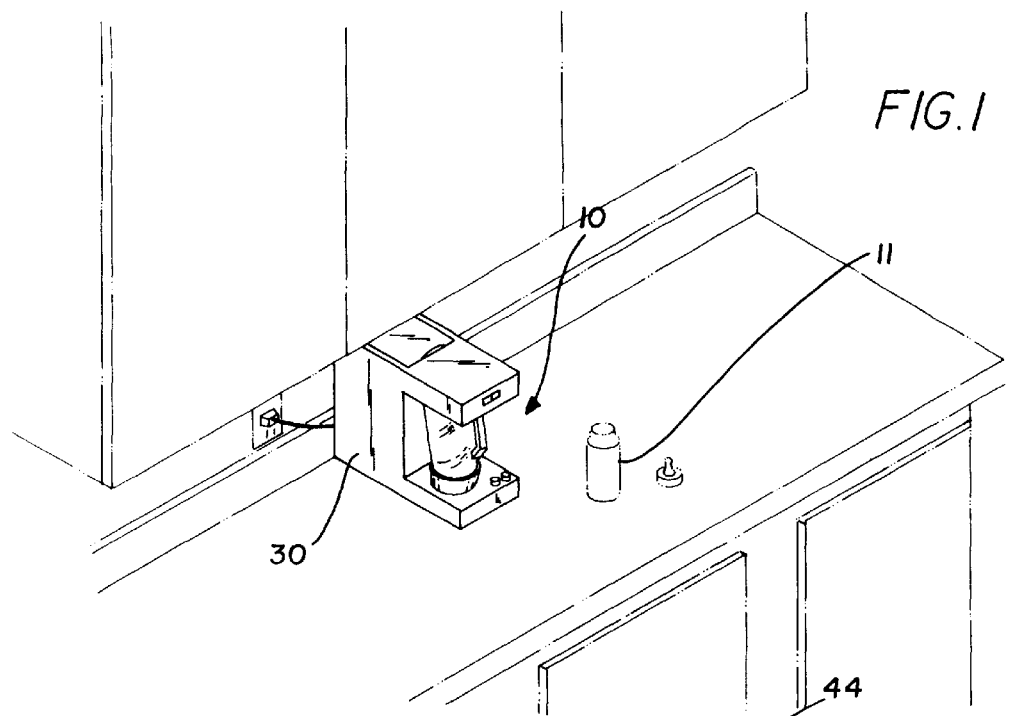
FIG. 1 is a perspective view of a new baby formula preparation system according to the present invention.
Figure 2:
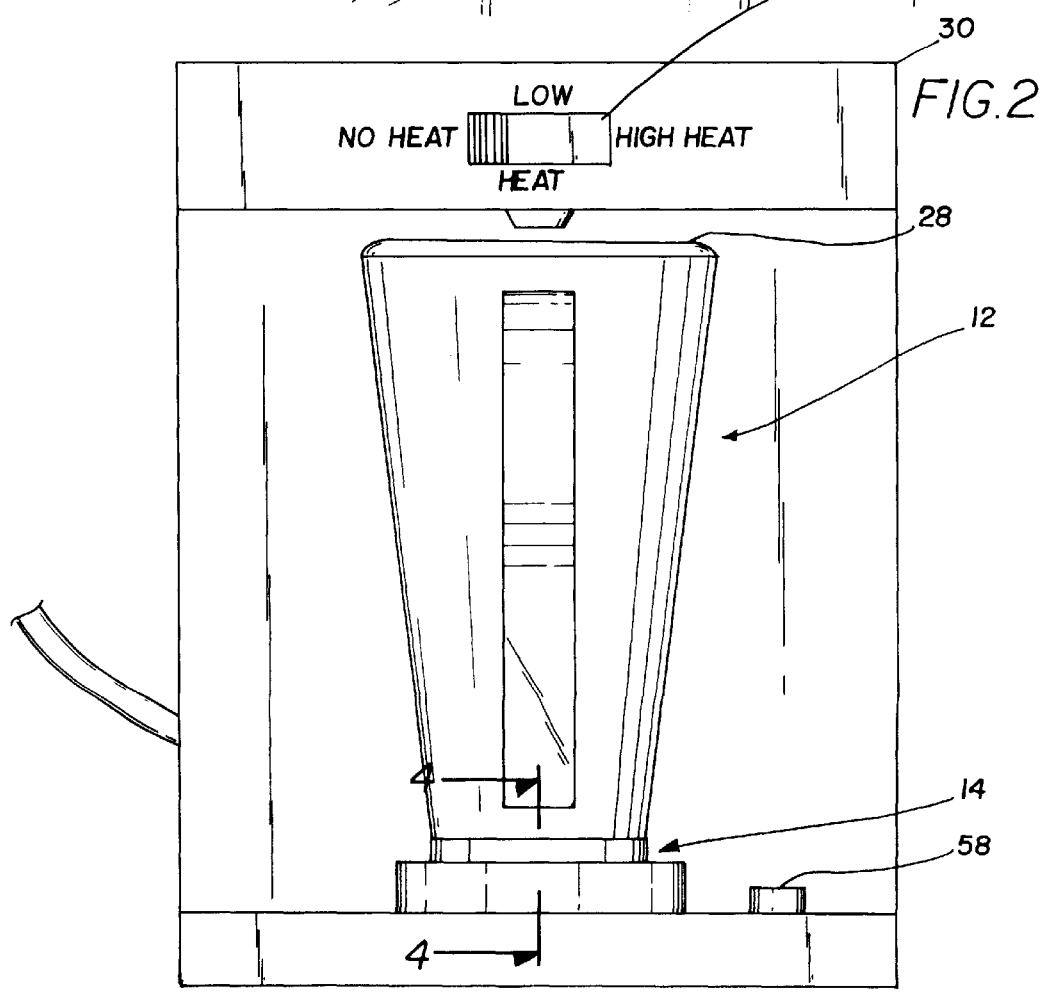
FIG. 2 is a front view of the present invention.

With reference now to the drawings, and in particular to FIGS. 1 through 4 thereof, a new baby formula preparation system embodying the principles and concepts of the present invention and generally designated by the reference numeral 10 will be described.

Figure 3:
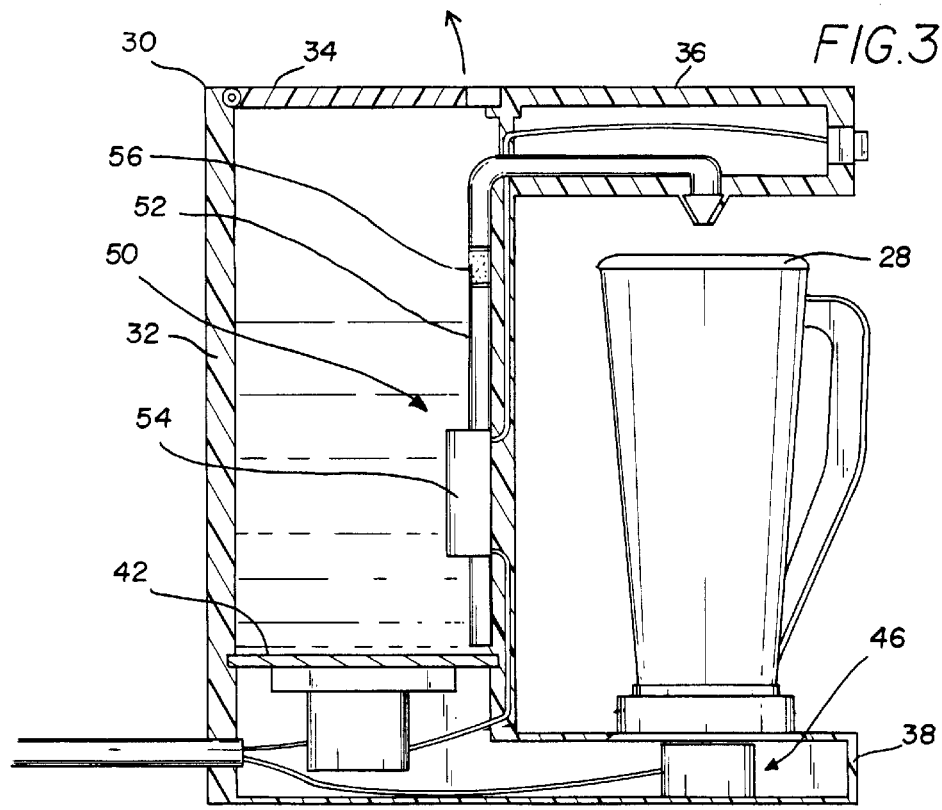
FIG. 3 is a side cross-sectional view of the present invention.

The present invention, designated as numeral 10, includes a baby bottle 11 with a removably cover having a nipple formed thereon. Also included is a blender 12 having a container with an inverted frusto-conical configuration with an open top and an open bottom. As shown in FIG. 3, a closed loop handle is mounted on the container. Further, the container preferably has measurement indicia printed thereon.

Figure 4:
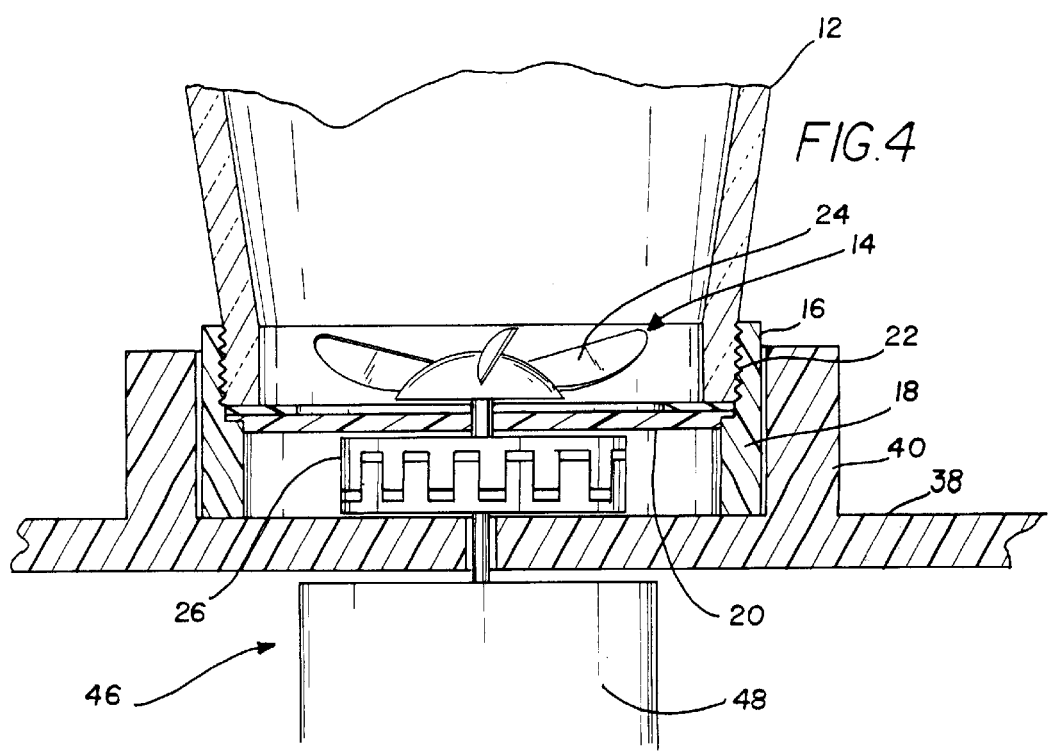
FIG. 4 is a detailed side cross-sectional view of the present invention taken along line 4—4 shown in FIG. 2.

The blender further includes a blade assembly 14 having a base 16. With reference now to FIG. 4, the base assembly is shown to include an annular portion 18 defining a cylinder and a planar portion 20 coupled within a central extent of the annular portion. As such, the annular portion defines a lip with a lower extent extending downwardly from the planar portion. The annular portion further defines an upper extent extending upwardly from the planar portion with a plurality of threaded grooves 22 formed therein. Such threaded grooves are adapted for engaging threaded grooves formed in the open bottom of the container.

The blade assembly of the blender further includes a plastic blade 24 rotatably mounted above the planar portion of the base. In the preferred embodiment, the blade takes the form of a propeller with dull, rounded edges. An engagement portion 26 is rotatably mounted below the planar portion of the base and fixed to the blade for rotating coincidentally therewith. As shown in the Figures, the blender further includes a lid 28 removably coupled to the open top of the container. For reasons that will soon become apparent, the lid has a central aperture formed therein.

As shown in FIG. 3, a housing 30 is provided including a central portion 32 having a rectangular configuration with a square bottom face and a peripheral side wall. Such peripheral side wall is formed of a front face, a rear face, and a pair of side faces defining an interior space and an open top. For allowing access to the interior space of the housing, the open top has a lid 34 hingably coupled to the rear face of the peripheral side wall.

The housing further includes an upper extension 36 integrally coupled to the front face of the peripheral side wall adjacent to the open top and extending outwardly therefrom. Associated therewith is a lower extension 38 integrally coupled to the front face of the peripheral side wall adjacent to the bottom face. The lower extension of the housing extends from the central portion of the housing in parallel relationship with the upper extension. The lower extension further has an annular lip 40 coupled to a top surface thereof and extended upwardly therefrom.

Mounted between each face of the peripheral side wall of the housing is a heating plate 42. As shown in FIG. 3, the heating plate resides adjacent to the bottom face of the housing for defining a water compartment which may be filled with water via the open top of the housing. The heating plate is connected to a power source with a heating control switch 44 connected therebetween which is mounted to a front surface of the upper extension.

In use, the heating control switch is adapted for controlling the heating of the water within the housing. Preferably, the switch has discrete orientations each corresponding to a degree to which the water is heated. In the preferred embodiment, at least one orientation is dedicated for boiling and sterilizing the water and another orientation is dedicated for not heating the water. As an option, temperature feedback may be employed to more accurately heat the water to a desired temperature.

FIG. 4 best shows a blending mechanism 46 including an engagement portion rotatably mounted on the lower extension of the housing. The engagement portion of the blending mechanism is preferably situated within the annular lip for engaging that of the blender when the same is mounted thereon. Mounted within the lower extension of the housing is a motor 48 that is connected to the engagement portion of the blending mechanism for rotating the same upon the actuation thereof.

With reference again to FIG. 3, it is shown that a pump assembly 50 includes a tube 52. Such tube has a first open end positioned adjacent to the heating plate within the water compartment of the housing. A second end of the tube extends through the upper extension and downwardly from a bottom surface thereof. It is imperative that the second end of the tube reside above the aperture of the lid of the blender during use. The pump assembly further includes a pump 54 mounted on the tube. In operation, the pump of the pump assembly serves for pumping water from within the water compartment into the container of the blender upon the actuation thereof. For filtering water flowing within the tube when the pump is actuated, a filter 56 is preferably mounted on the tube. As an option, the filter may be replaceable. It should be noted that in alternate embodiments, the filter may be excluded in favor of the heating element or visa versa.

Finally, a control assembly taking the form of control circuitry or the like is connected between the motor of the blending mechanism and the pump of the pump assembly. The control assembly serves to actuate the pump and the motor coincidentally upon the depression of an actuation button 58 mounted on the lower extension of the housing. As an option, a dial control will serve to heat the water to desired temp. and then actuate the pump and motor coincidentally. As an option, the control assembly may simply be adapted to deactuate the pump and the motor after a predetermined amount of time. In the alternative, a deactivation switch may be included for permitting selective deactuation.

During use, a user may insert a powered baby formula within the container of the blender after which the blender is mounted on the housing. Thereafter, water is inserted within the water compartment of the housing. Then, the user may select the extent to which the water is to be heated. After waiting a short time period, the user may depress the actuation button thereby pumping the heated water into the container and blending the same with the powered baby formula. Thereafter, the aperture of the lid may be sealed with a plug and the blender stored in a refrigerator. When the user decides to utilize the baby formula, he or she may simply dispense the same into the baby bottle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baby formula brewer and blender comprising, in combination:

a baby bottle including a removable cover having a nipple formed thereon;

a blender including a container having an inverted frusto-conical configuration with an open top, an open bottom and a closed loop handle mounted thereon, the blender further including a blade assembly having a base with an annular portion defining a cylinder and a planar portion coupled within a central extent of the annular portion such that the annular portion defines a lip with a lower extent extending downwardly from the planar portion and an upper extent extending upwardly from the planar portion with a plurality of threaded grooves formed therein for engaging threaded grooves formed in the open bottom of the container, the blade assembly further including a plastic blade rotatably mounted above the planar portion of the base and an engagement portion rotatably mounted below the planar portion of the base and fixed to the blade for rotating coincidentally therewith, the blender further including a lid removably coupled to the open top of the container and having a central aperture formed therein;

a housing including a central portion having a rectangular configuration with a square bottom face and a peripheral side wall formed of a front face, a rear face, and a pair of side faces defining an interior space and an open top, the open top having a lid hingably coupled to the rear face of the peripheral side wall for allowing access to the interior space, the housing further including an upper extension integrally coupled to the front face of the peripheral side wall adjacent to the open top and extending outwardly therefrom and a lower extension integrally coupled to the front face of the peripheral side wall adjacent to the bottom face and extending therefrom in parallel relationship with the upper extension, the lower extension having an annular lip coupled to a top surface thereof and extending upwardly therefrom;

a heating plate mounted between each face of the peripheral side wall of the housing adjacent to the bottom face thereof for defining a water compartment for being filled with water via the open top of the housing, the heating plate connected to a power source with a heating control switch connected therebetween, the heating control switch being mounted to a front surface of the upper extension for controlling the heating of the water within the housing;

a blending mechanism including an engagement portion rotatably mounted on the lower extension of the housing within the annular lip for engaging that of the blender when the same is mounted thereon, a motor mounted within the lower extension of the housing and connected to the engagement portion thereof for rotating the same upon the actuation thereof;

a pump assembly including a tube having a first open end positioned adjacent to the heating plate within the water compartment of the housing and a second end extending through the upper extension and from a bottom surface thereof above the aperture of the lid of the blender, the pump assembly further including a pump mounted on the tube for pumping water from within the water compartment into the container of the blender upon the actuation thereof;

a filter mounted on the tube for filtering water flowing within the tube when the pump is actuated; and control means connected between the motor of the blending mechanism and the pump of the pump assembly, the control means adapted to actuate the pump and the motor coincidentally upon the depression of a button mounted on the lower extension of the housing.

2. A baby formula preparation system comprising:

a housing defining a reservoir therein and having a lower extension and an upper extension above the lower extension;

a blender container removably mounted on the lower extension between the lower and upper extensions of the housing, the blender container having an agitator rotatably mounted therein, the blender container having an upper opening;

a blender mechanism located in the lower extension of the housing, the blender mechanism being operatively coupled to the agitator of the blender container for agitating fluid within the blender container upon the actuation of the blending mechanism; and a pump assembly situated in the housing for pumping fluid from the reservoir of the housing through the upper extension and into the upper opening of the blender container.

3. A baby formula preparation system as set forth in claim 2 wherein the pump assembly is situated in the interior of the reservoir of the housing.

4. A baby formula preparation system as set forth in claim 2 and further including a heater for heating fluid held in the reservoir of the housing.

5. A baby formula preparation system as set forth in claim 2 wherein a filter is interposed in a conduit connected to an outlet of the pump assembly for filtering the fluid leaving the reservoir.

6. A baby formula preparation system as set forth in claim 2 wherein the reservoir of the housing is located at the same vertical level as the blender container.

7. A baby formula preparation system as set forth in claim 2 wherein the blender container has a removable lid with an aperture formed therein.

8. A baby formula preparation system as set forth in claim 2 and further including a heater for heating fluid held in the reservoir of the housing, wherein the extent to which the heater heats the water is controlled by a user-actuated control.

9. A baby formula preparation system as set forth in claim 2 and further including a control assembly for actuating the blending mechanism and the pump assembly coincidentally.

10. A baby formula preparation system comprising:

a blender including a container having an open top, an open bottom and a closed loop handle mounted thereon, the blender further including a blade assembly having a base with an annular portion with a plurality of threaded grooves formed therein for engaging threaded grooves formed in the open bottom of the container, the blade assembly further including a blade rotatably mounted above the base and an engagement portion rotatably mounted below the base and fixed to the blade for rotating coincidentally therewith, the blender further including a lid removably coupled to the open top of the container and having a central aperture formed therein;

a housing including a central portion having a bottom face and a peripheral side wall formed of a front face, a rear face, and a pair of side faces defining an interior space and an open top, the open top having a lid hingably coupled to the peripheral side wall for allowing access to the interior space, the housing further including an upper extension integrally coupled to the front face of the peripheral side wall adjacent to the open top and extending outwardly therefrom and a lower extension integrally coupled to the front face of the peripheral side wall adjacent to the bottom face and extending therefrom in parallel relationship with the upper extension, the lower extension having an annular lip coupled to a top surface thereof and extending upwardly therefrom;

a heating plate mounted between the peripheral side wall of the housing adjacent to the bottom face thereof for defining a water compartment for being filled with water via the open top of the housing, the heating plate being connected to a heating control switch for controlling the heating of the water in the housing;

a blending mechanism including an engagement portion rotatably mounted on the lower extension of the housing within the annular lip for engaging the engagement portion of the blender when the blender is mounted on the lower extension, a motor mounted in the lower extension of the housing and being connected to the engagement portion of the blending mechanism for rotating the engagement portion;

a pump assembly including a tube having a first open end positioned in the water compartment of the housing and a second end extending through the upper extension and from a bottom surface thereof to a position above the aperture of the lid of the blender, the pump assembly further including a pump mounted on the tube for pumping water from the water compartment into the container of the blender upon the actuation of the pump;

a filter mounted on the tube for filtering water flowing in the tube when the pump is operated; and control means connected between the motor of the blending mechanism and the pump of the pump assembly, the control means adapted to actuate the pump and the motor coincidentally upon the depression of a button mounted on the housing.

* * * * *